April 30, 1963 A. F. BRUNTON 3,087,549
FORMATION TESTING DEVICE
Filed July 8, 1960 3 Sheets-Sheet 2

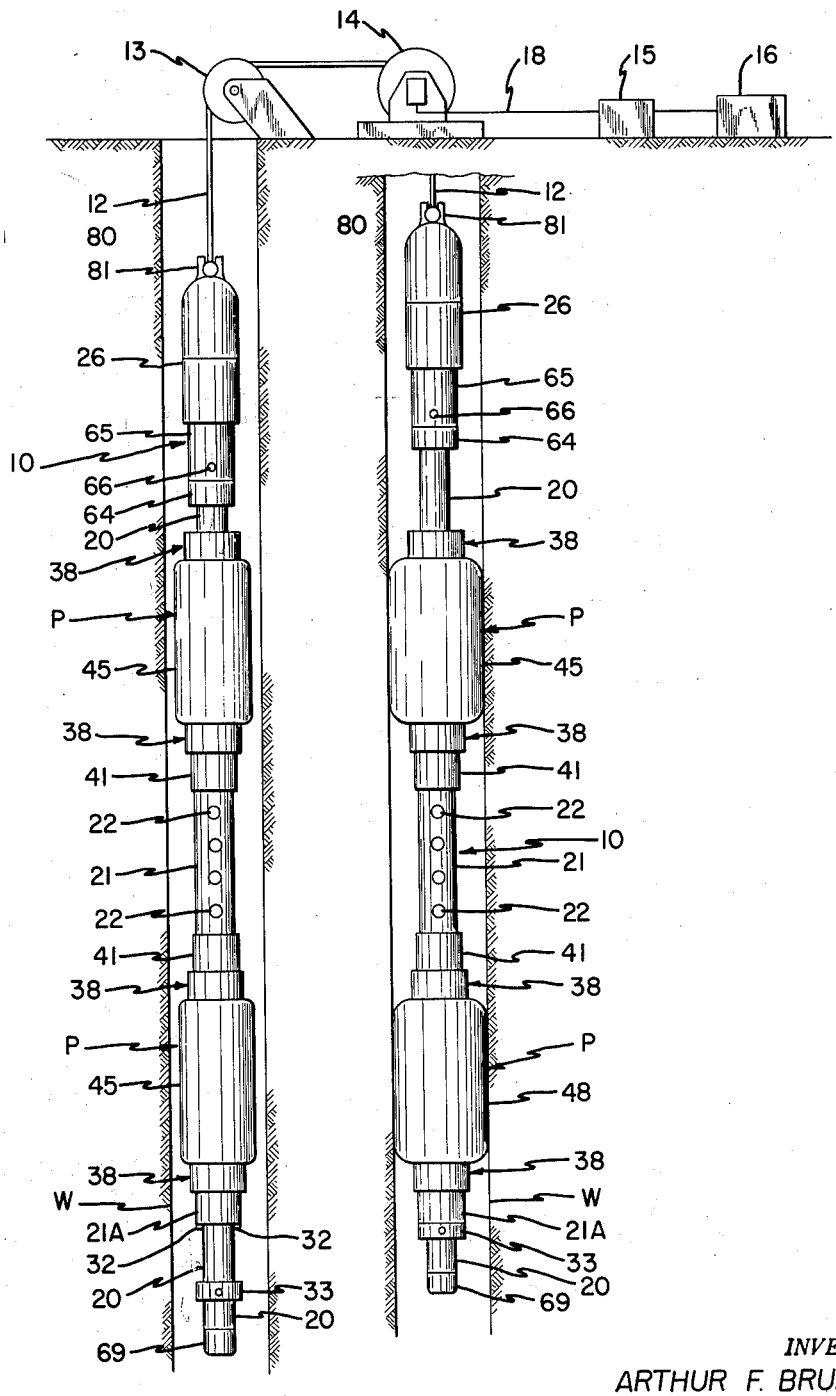

INVENTOR.
ARTHUR F. BRUNTON
BY
*Philip H. Sheridan*
ATTORNEY

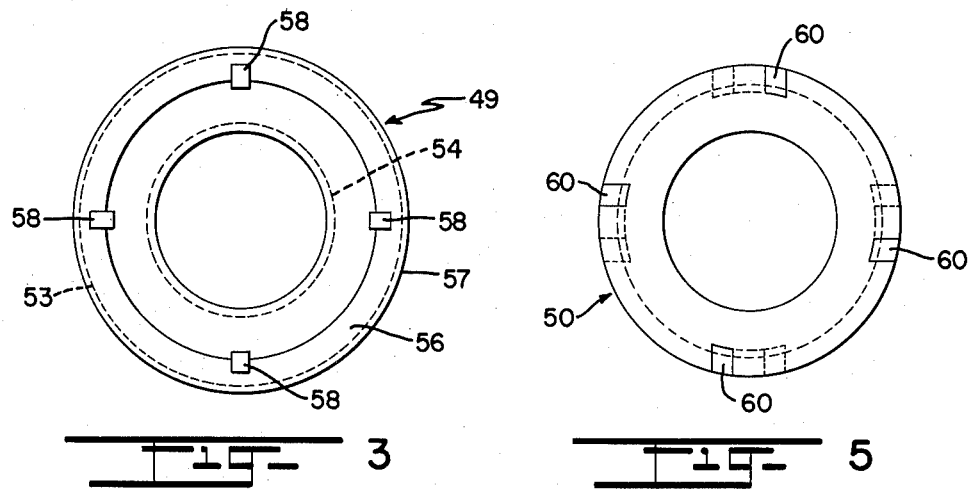
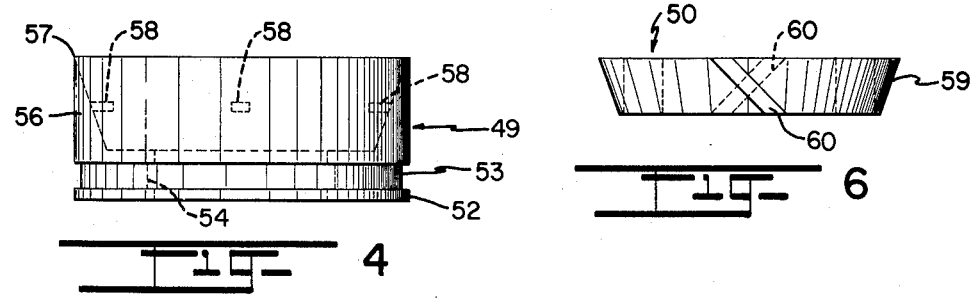
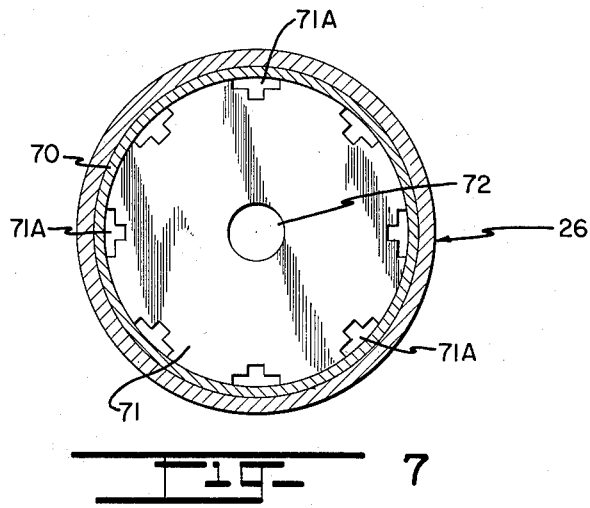

United States Patent Office 3,087,549
Patented Apr. 30, 1963

3,087,549
FORMATION TESTING DEVICE
Arthur F. Brunton, Denver, Colo.
Filed July 8, 1960, Ser. No. 41,531
15 Claims. (Cl. 166—142)

This invention relates to a new and improved testing device adapted for use in removing samples from a well formation, and more particularly pertains to a new and useful device which is suitable for use as a wireline formation testing tool and which is further capable of use in either cased or uncased holes, or as a bottom-hole or side-wall formation tester.

In formation testing operations, it is customary to carry out a succession of steps in the removal of a sample from the formation to be tested, which steps generally include that of lowering the tester to the desired depth opposite the face of the formation, expanding either a single or pair of packers into firm engagement with the wall of the bore so as to isolate the formation to be tested, withdrawing the sample into the tester and enclosing it therein, followed by release of the packer assembly or assemblies and removal of the entire tester and contained sample from the well bore. Accordingly, it is highly desirable in carrying out such operations to make the tester conformable for use under varying conditions such as to carry out bottom-hole or side-wall testing, and to be adjustable in capacity depending upon the size of the formation and amount of sample which it is desired to withdraw, and of course to accomplish the entire testing operation with the least possible interruption in normal drilling; and moreover, to make the device positive in actuation and release so as to almost completely eliminate any danger of accidental sticking in the well bore.

As a result, it is a principal object of the present invention to make provision for a testing device which, in accomplishing the above-desired objectives, does so with a minimum number of parts of lightweight construction so as to obviate the necessity of suspension from a drill stem, but instead may be suspended from a wireline and thereby avoid the time consuming requirement of successive lowering and raising of the drill stem into the well bore whenever it is desired to carry out the formation testing operation.

It is another object of the present invention to provide for a formation testing device which may be utilized either in bottom-hole testing or side-wall testing, and which is especially suitable for use as a wireline tester incorporating a unique arrangement whereby the tester is variable in capacity depending upon the amount of sample to be withdrawn, and is positive in operation for isolation of the desired formation, removing and containing the sample, and followed by positive release of the tester for removal from the well.

It is another object of the present invention to provide in a formation testing device, particularly a wireline tester, a unique packer assembly for positioning of the tester and isolation of the desired formation wherein the packer assembly is adjustable in spacing depending upon the amount of sample to be withdrawn, and is further positively expansible and releasable by accurate, remote control at the surface.

It is a still further object of the present invention to provide for a unique way of actuating by remote control successive elements forming a part of the tester of the present invention for a novel severing assembly associated with each of the packers to accomplish release of the packers from the well bore at the desired time in a reliable and dependable way.

It is an additional object of the present invention to make provision in novel combination with a formation tester for a pressure equalizing assembly which is capable of equalizing the pressure above and below the formation being isolated by the packer assembly without interfering with the various steps carried out in performing the testing operation.

The above and other objects and advantages of the present invention will become more readily apparent from the following description taken together with the accompanying drawings, in which:

FIGURES 1A and 1B are elevational views illustrating, respectively, the disposition of the preferred embodiment of the present invention exemplified by a wireline formation testing device where in FIGURE 1A the packer assemblies are illustrated first in the release position for lowering and raising through the well bore and secondly in FIGURE 1B in the expanded position for isolation of the formation to be tested.

FIGURE 3 is a detailed plan view of the knife portion of the knife assembly employed in the present invention.

FIGURE 4 is a front view of the knife portion shown in FIGURE 3.

FIGURE 5 is a detailed plan view of the knife guide portion employed in the preferred form of knife assembly in accordance with the present invention.

FIGURE 6 is a front view of the knife guide portion shown in FIGURE 5; and

FIGURE 7 is a sectional view taken on line 7—7 of FIGURE 2A.

Figures 2A, 2B, 2C:
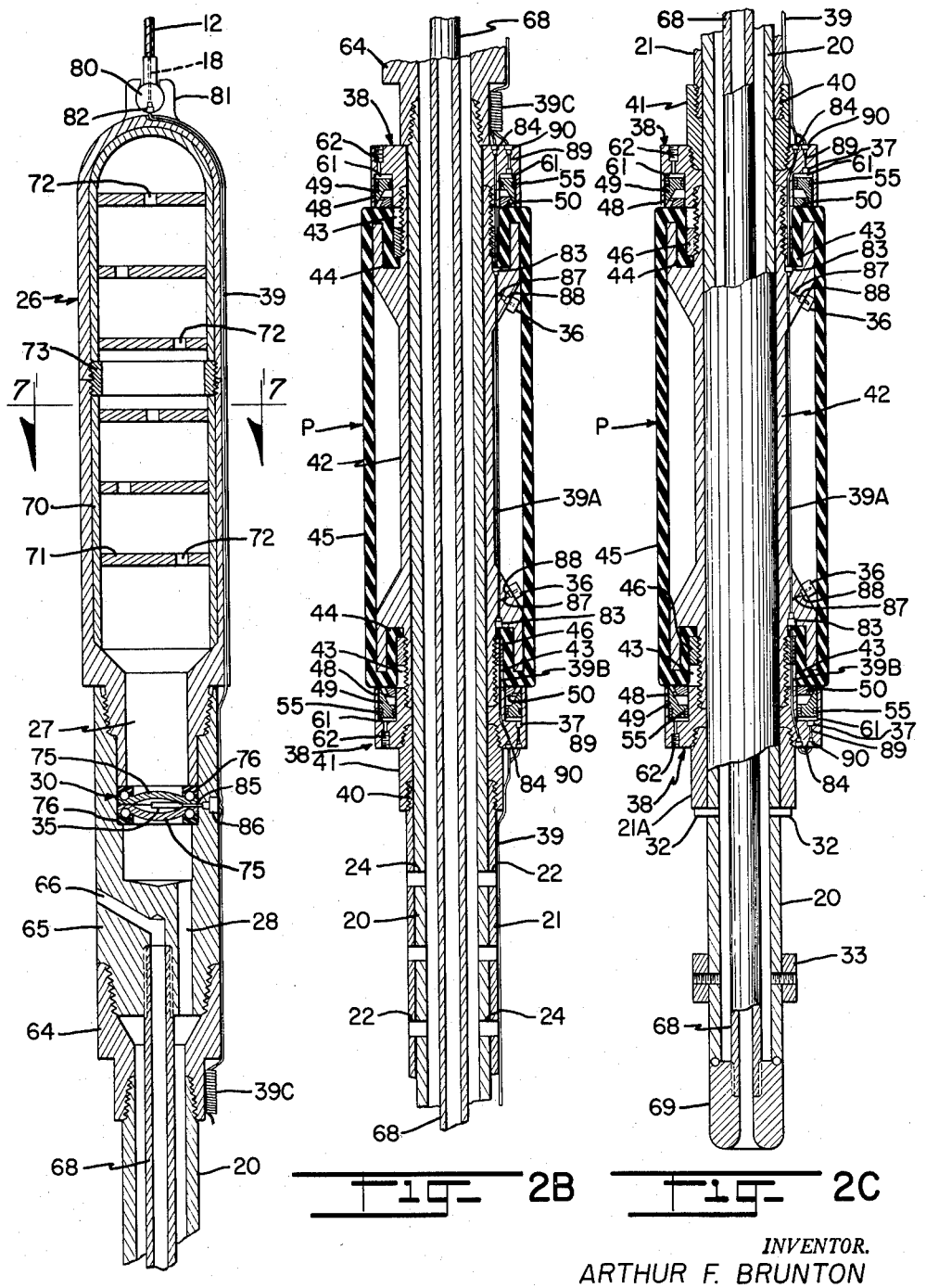
FIGURES 2A, 2B and 2C are exploded views illustrating in section the preferred embodiment of the present invention.

Referring more particularly to the drawings, there is shown by way of illustrative example in FIGURES 1A and 1B a preferred form of formation testing device 10 employed as a wireline formation tester by suspension from a cable 12 which operates through a guide pulley 13 by reeling and unreeling the cable on drum 14 disposed at the ground surface. In FIGURE 1A the formation testing device 10 is illustrated with packer assemblies P in retracted position for lowering through a well bore W to the desired depth therein in which relation the packer assemblies P are positioned above and below the formation to be tested. In this position the packers may then be expanded in a manner to be described so as to isolate the formation for removal of the desired amount of sample, and the latter expanded state is illustrated in FIGURE 1B. Also represented in FIGURE 1A, are a rheostat 15 and a generator 16 which are electrically connected to a conductor wire 18 which is encased within the cable 12 so as to essentially form an integral part thereof. For a purpose to be described, and forming an important feature of the present invention, the wire 18 extends through the cable 12 for electrical connection to the upper end of the testing device and is accordingly simultaneously reeled and unreeled with the cable as it is being raised and lowered respectively through the well bore.

As stated, the formation testing device of the present invention is capable of use either in bottom-hole testing or side-wall testing, and further may be adapted for use in conjunction with a drill stem but is preferably employed and controlled in lowering and raising by a wireline which is much more rapid and easier to use. The present invention is therefore being described solely with reference to its utility as a wireline formation tester, since notwithstanding the relatively few parts it is made conformable for use under practically all conditions encountered in formation testing and is further controllable in capacity and length depending upon the amount of sample to be removed and size of formation. Broadly therefore and to accomplish the above, the formation testing device 10 is essentially comprised, as best seen from FIGURES 2A–2C, inclusive, of inner and outer concentric, telescoping tubular members 20 and 21, respectively, and with the outer tubular member 21 actually forming a part of the packer assembly wherein the packers P are disposed in spaced relation, which spacing is dependent upon the length of the outer tubular member. The outer tubular member 21 further includes inlet ports 22 which may be suitably in the form of large perforations spaced in vertical series along the intermediate portion of the tubular member and centrally between the packers P for communication with the formation sample. In turn, the inner tubular member 20 extends in telescoping relation to the outer tubular member and similarly includes a vertical series of inlet ports 24 which by control of the positional relation of the inner tubular member 20 with the outer member 21 may either be aligned with the inlet ports 22 or moved out of alignment with the ports so as to close off the interior of the testing device from the formation.

To receive the fluid sample as it is withdrawn from the formation, a fluid chamber 26 is shown mounted above the inner tubular member 20 with a central passage 27 and offset bore 28 extending downwardly for communication with the interior of the tubular member 20. Disposed across the central passage 27 to seal off the fluid chamber from the interior of the tubular member 20 prior to the time that the sample is taken is a valve member 30 preferably defined by a diaphragm or disc which may be ruptured at the desired interval so as to establish communication between the fluid chamber and the formation through the aligned inlet ports 22 and 24. To initially position the concentric tubular members 20 and 21 with the ports 22 and 24 in aligned relation, aligning means such as conventional shear pins 32 may be positioned to project outwardly near the lower end of the inner tubular member 20 to limit the downward movement of the outer tubular member 21, in which relation the ports on the respective members are dimensioned to be aligned with one another to form a common opening for the entry of fluid; then, suitable strain placed upon the inner tubular member sufficient to shear the pins will permit a release of the outer tubular member for continued downward movement as limited by a suitable stop collar 33 so that the inlet ports 22 and 24 are moved out of alignment to seal off the interior of the testing tool.

In order to sequentially expand the packers to isolate the formation to be tested, rupture or otherwise open the valve 30 for entry of the sample into the fluid chamber (followed by movement of the concentric tubular members so as to seal off the interior of the testing device in a conventional way), and finally to positively release or deflate the packers P to allow removal of the testing device from the formation, a unique way is provided to carry out these steps positively and reliably by remote control in desired sequence. The means employed is characterized broadly by the use of a series of explosive charges including a charge 35 located with the valve 30, charges 36 located with the packers P and charges 37 located within knife assemblies 38, there being a knife assembly 38 located at opposed ends of each of the packers which in response to detonation will be effective to perform a simultaneous severing and cutting action upon the ends of the packers to permit release of the entire device from the well bore. Essentially, successive detonation of the charges employed in association with the valve member 30 and the packer assembly P is accomplished through the use of an electrical conductor wire 39 having a series of branch lines of varying resistivity so that firing of each charge will depend upon current level developed at the surface through the conductor wire 18 so that each charge can be fired in succession from a single conductor wire cable.

The entire packer assembly employed in conjunction with the formation tester is defined essentially by the outer tubular member 21 which extends continuously between the near ends of the packers P, together with an extension 21A which is secured to the lower end of the lower packer P and actually abuts against the shear pins 32. To enable connection of the ends of the tubular member with each of the packers P, the ends of tubular member 21 are exteriorly threaded as at 40 for connection of suitable adaptors 41 to which are secured the packers P. Each of the packers P is similarly formed to include a spacer sleeve 42 which is recessed at opposed ends as indicated at 43 for reception of enlarged ends 44 of a packer element 45. To securely retain the ends 44 of each packer element in place, a packer retention collar 46 is threadedly connected to the ends of the sleeve 42, as seen from FIGURES 2B and 2C. Also connected to the opposed threaded ends of each spacer sleeve 42 are the knife assemblies 38, and each is generally in the form of an annular body portion and serves to interconnect the adaptors 41 and ends of the spacer sleeve 42 with an end surface of each knife assembly abutting against the end portion of each packer element 45.

Referring only to the mechanical details of each of the knife assemblies 38, and by reference to FIGURES 3 to 6, each is generally constituted of an annular body portion which is formed with a relatively deep annular channel 48 facing towards the end of the packer element for slidable disposition therein of a circular knife member 49 and a ring-like guide member 50. As shown in FIGURES 3 and 4 the knife element 49 includes a lower relatively thickened portion 52 which is exteriorly grooved as at 53 and interiorly grooved as at 54 for reception of suitable piston rings 55 (illustrated only in FIGURES 2B and 2C). The knife proper is defined by an upwardly tapered ring portion 56 which terminates in a knife edge 57, and positioned at spaced intervals intermediately around the inner surface of the knife proper are inward projections 58 which are disposed in predetermined relation to the guide portion 50. The knife guide 50, shown in FIGURES 5 and 6, is dimensioned on its inner diameter to snugly engage the inner surface of the channel 48, and its exterior surface 59 is of generally conical form including a series of four equally spaced, angular slots 60 which are proportioned for reception of the projections 58 so as to permit the projections 58 to ride upwardly and downwardly through the slots in generally helical fashion as the knife 49 is caused to advance toward the respective end of each packer element 45. In addition, each channel 48 is dimensioned to receive an explosive charge (not shown); also, extending vertically into communication with the clearance area 61 is a pressure release plug 62 which permits pressure to be bled off from behind the knife assembly so as to permit resetting for the next operation.

It will be noted that the vertical spacing between packers P may be adjusted for example, depending upon the quantity of sample to be removed and of the characteristics and size of the formation to be tested, and this is easily accomplished by regulating the length of the outer tubular member 21 in accordance with the spacing desired; or, in the alternative, more than one tubular section may be employed to form the outer tubular member. Of course, in this relation, the inner tubular member must also be regulated in length in accordance with that of the outer tubular member to insure that the ports 22 and 24 will be in proper alignment when the extension 21A of the outer tubular member is resting against the shear pins 32.

The inner tubular member 20 extends continuously throughout the packer assembly and a limited distance beyond the uppermost knife assembly 38, and is exteriorly threaded for connection of an adaptor 64 which is in turn connected through sub 65 to the lower end of the fluid chamber 26. The sub 65 is in itself of conventional form to serve as a pressure equalizing member having a laterally extending bore 66 communicating with the well bore; and, through connection with a tube 68 which extends downwardly in inner spaced concentric relation to the inner tubular member 21, the sub communicates through a guide shoe 69 with the well bore W at the lower end also. Thus in a well known manner, pressure equalization is established on opposed sides of the packer assembly to remove any possible strain from the cable due to pressure differential. In other respects, the sub 65 forms a housing for the valve 30 and also includes the offset bore 28 and central passage 27 which as stated establish communication between the fluid chamber and the aligned inlet ports 22 and 24 through the concentric space formed between the tube 68 and tubular member 20.

The fluid chamber 26 is generally in the form of a cylinder closed at one end having an inner lining 70, and spaced at vertical intervals throughout as shown in FIGURE 7 are baffles 71 resting on suitable spaced supports 71A and having openings 72 staggered in relation to one another so as to reduce the surge or turbulence of the fluid sample as it enters the fluid chamber. Additionally, it is preferred to form the fluid chamber in sections which is accomplished by means of connection collar or union 73 so as to permit addition of extra cylindrical sections depending upon the volume of recovery of fluid samples desired. The lowermost section of the fluid chamber is reduced in diameter for insertion and connection within the sub 65, and the valve 30 is preferably disposed just beneath the lower end of the fluid chamber to extend across the passage 27 and to temporarily interrupt communication between the fluid chamber and the formation itself until it is time to take the sample.

In its preferred form, the valve 30 is defined by a frangible or rupturable member, and as illustrated this may take the form of spaced concave-convex porcelain discs 75 which are securely held in place to the wall of the passage 27 by means of spaced rubber retention rings 76, and together the discs 75 form a hollow area therewithin for disposition of the explosive charge 35.

Having thus described the mechanical relationship between the parts forming the formation tester, reference will now be made to the means employed for actuating through a succession of steps the formation tester in the removal of a sample. As stated, the conductor wire 18 extends preferably through the center of the cable 12 in order to protect it, and for ease of assembly and disassembly the cable may be removably connected to the top of the fluid chamber by means of a suitable ball and socket connection 80 and 81 respectively. The socket 81 further may be provided with a connector jack 82 for installation of the conductor wire 18 extending through the cable 12 and ball 80, as illustrated in FIGURE 2A. Continuing from the connector jack 82 is the main conductor wire 39 and this conductor wire forms a continuous lead throughout the entire testing device, and preferably extends wherever necessary along the exterior surface of the device in a longitudinal groove, not shown, in order to protect it from accidental displacement or severance with the exception at the packers P, each includes at opposed ends of each of the spacer sleeves 42 connector jacks 83 and a connecting line 39A, and similarly each of the knife assemblies have connector jacks 84 and a connector line 39B, the lines 39A and 39B forming parts of the main conductor circuit. Between the packers, it will be noted that the conductor wire 39 continues along the exterior surface of the outer tubular member 21 and terminates at its point of connection with the connector jack 84 at the lower end of the lower packer assembly. Moreover, just above the uppermost knife assembly, the main conductor wire 39 is coiled as at 39C so as to permit extension of the wire when the shear pins 32 are severed to permit downward movement of the outer tubular member in relation to the inner tubular member.

To detonate the explosive charge 35 within the valve 30, a branch line 85 is connected by means of a connector jack 86 to the main conductor wire 39 and the branch line is of a resistivity to cause detonation of the charge only upon the development of a predetermined amperage across the main circuit. Similarly, to expand each of the packers P, the explosive charges 36 are shown mounted upon the spacer sleeves 42, and branch lines 87 lead from the connector wires 39A into connector jacks 88 for the charges 36. Also, to detonate the charges 37 in each of the knife assemblies 38, branch lines 89 with connector jacks 90 are provided for connection between the explosive charges and the main conductor wire.

In construction, the branch wires employed for interconnection between the main circuit and each of the explosive charges are formed of sections of replaceable wire since upon detonation and removal of the tester from the well bore it will be necessary to reset each of the charges for the next operation. As mentioned, each of the branch wires are of varying resistivity to the end of permitting detonation in desired succession of each of the charges off of a single main circuit or common conductor wire. Accordingly, the wires may be formed for example of resistances such that a successive increase in current is required for detonation of each charge in the desired order. Thus for example, in operation, the explosive charges 36 for each of the packer elements P may be set to detonate by controlling the resistance of their branch lines at a level of 0.15 amp; the charge 35 may be set for detonation at a level of 0.25 amp; and the charges for the knife assemblies of the upper packer may be set to actuate the knives at 0.40 amp, and the knife assembly charges for the lower packer at 0.60 amp.

To conduct a typical formation testing operation and assuming that a fluid sample is to be removed in a sidewall test, when the tool is positioned by lowering through the well bore opposite the zone to be tested, sufficient amperage may be developed at the surface first to detonate the explosive charges 36 for expansion of the packer elements 45 into snug, sealed engagement at opposite limits of the formation. In practice, the explosive charges 36 are designed to provide a predetermined pressure in order to insure an effective seal of the packer elements under varying conditions of depth, hydrostatic pressure, hole size, etc. Thus, various sized charges can be employed as conditions from hole to hole change, and the expansion of the packers may be checked in each operation by attempts to raise and lower the tool. Once the packer elements are securely positioned in place, a higher current level may be developed to ignite the explosive 35 in the main valve 30 so as to shatter the valve and open the fluid chamber to the formation, assuming that the ports 22 and 24 are properly aligned as described. Here, it will be seen that the pressure equalizing system will also insure that the tool will remain in position with no additional strain being placed on the cable.

When the tool has remained open for the required length of time to remove the desired sample from the formation, a strain may be placed on the tool at the surface through the cable 12 until the shear pins 32 are severed. This permits all sections of the tool connected to the inner tubular member to be raised until the lower extension 21A moves into contact with the stop collar 33 and thereby to move the ports 22 and 24 out of alignment and effectively seal off the fluid chamber from the formation again. Of course, where a series of ports are being employed, the relative distance of movement between the tubular members should be such as to insure that all ports 24 on the inner tubular member will move completely out of alignment with the outer ports 22 so as to completely close the tool. At this point, the upper packer is preferably first released by activating the knife assemblies through detonation of the charges, and again the amperage required being higher than that used for detonation of the main valve. Detonation of the charges 37 will serve to apply an extremely high pressure behind the knives 48 forcing them to move rapidly toward and through the ends of the packers. In this operation, the knives are caused to rotate due to the constrained movement of the projections 58 within the slots 60 so as to effect a combined cutting and tearing action as the circular knives move through the flexible rubber of the packer elements. Once the packer is severed, the overlying hydrostatic pressure in the formation will serve to collapse the packer against the tool for complete release from the wall of the well bore. Similarly, the lower packer may be released by activation of its associated knife assemblies whereupon the entire tool is freed for removal from the well bore. With the tool at the surface, the fluid chamber may then be bled and emptied to check recovery of the sample. As described, the knife assemblies may then be reset through removal of the pressure release on plugs, and also the branch lines and charges may be reset for the next testing operation.

It will be evident from the above, that actually although knife assemblies are employed at each end of each of the respective packers, it will only be necessary under normal conditions to sever each packer at one end only. Thus, opposed knife assemblies for each of the packers may be set for detonation at spaced amperage levels so that under normal conditions one knife assembly only will be detonated; however, in the event of malfunctioning of either one of the knife assemblies then the opposed knife assembly will be available for emergency use.

It will further be evident that the tool of the present invention may with little or no modification be employed in cased holes although in such event of course the exterior dimensions of the tool necessarily would have to be scaled down. In any application however, it will be seen that the tool is widely conformable for testing under substantially all conditions and due to its compact and light weight construction, employing a minimum number of parts and with an extremely accurate actuating or detonating system, fluid samples may be easily recovered in the desired quantities and over the desired time interval. These and many other advantages will be seen from the foregoing description of a preferred embodiment of the present invention. It is therefore to be understood that, while only a particular embodiment of the present invention has been shown and described, it is apparent that various changes and modifications may be made therein without departing from the scope of the invention in its broader aspects, and therefore that the appended claims are intended to cover all such changes and modifications as fall within the true spirit and scope thereof.

What is claimed is:

1. A formation testing apparatus comprising inner and outer concentric tubular means having packer members disposed in spaced relation thereon, said tubular means each being provided with at least one inlet port between the packer members and said tubular means being slidable in relation to one another, limiting means between said tubular means to hold said tubular means with their ports in aligned relation, said limiting means being releasable to enable sliding movement between said tubular means in order for the inlet ports to move out of aligned relation, a fluid chamber positioned for communication with the inlet ports when in aligned relation to receive a sample from the formation including a valve member to normally interrupt communication between said fluid chamber and the formation including valve opening means, inflating means contained within each packer operative to expand the packer members into sealed position relative to the formation whereupon opening of said valve a fluid sample is received from the formation, and means for each packer to cause release of said packer members from sealed relation with the wall of the formation for removal of said apparatus from the well bore.

2. A wireline formation testing apparatus comprising inner and outer concentric tubular members, the outer tubular member having inflatable packer members disposed in spaced relation thereon, the outer tubular member being of a length to determine the spacing between packer members in accordance with the quantity of fluid to be withdrawn and being provided with at least one inlet port between the packer members, the inner tubular member extending through the outer tubular member in slidable relation thereto including at least one inlet port in normal communication with the formation to be tested with means to temporarily secure said tubular members together with their inlet ports in aligned relation, a fluid chamber in normal communication with said inner tubular member, a pressure equalizing member including a fluid passage communicating with the formation on opposite sides of said packer members and a valve member interposed between said fluid chamber and the tubular member to normally interrupt communication therebetween, said inlet ports being closed in response to relative movement between the tubular members from aligned relation upon completion of removal of a sample to trap the sample in the fluid chamber, expanding means for each packer to successively expand said packer members into position against the formation, valve opening means for said valve to open said valve for entry of fluid into the fluid chamber and severing means for each packer to sever said packers, following closing of said inlet ports by relative movement between said tubular members, to cause release of said packer members from sealed relation with the wall of the formation for removal of said apparatus from the well bore.

3. A wireline formation testing apparatus according to claim 2 in which said severing means includes knife assemblies disposed at the ends of each of said packers and said severing means being operative to actuate said knife assemblies for severance and release of said packers.

4. A wireline formation testing apparatus according to claim 3 in which activating means are provided to energize said severing means thereby to actuate said knife assemblies in predetermined sequence.

5. In a well testing device for the removal of a fluid sample from a selected formation in a well bore having tubular means with normally open inlet ports therein for sample removal and means for closing the ports to trap the sample within the testing device, expansible packer members on said tubular means and a fluid chamber to receive fluid samples removed, the combination therewith of a valve disposed to normally interrupt communication between the fluid chamber and the formation to be sampled, explosive charges with each of the packer members for expansion thereof, a knife assembly disposed at at least one end of each of the packer members including an explosive charge with each knife assembly for actuation thereof to sever at least one end of each packer member, and detonating means of varying resistance being electrically connected to each of the charges for successively detonating said explosive charges for expansion of said packer members followed by detonation of said charges to actuate each knife assembly for release of the apparatus and contained fluid sample from the well bore.

6. In a well testing device for the removal of a fluid sample from a selected formation in a well bore having tubular means with a normally open inlet portion thereon for sample removal and means for closing the inlet portion to trap the sample within the testing device, spaced expansible packer members on said tubular means and a fluid chamber to receive fluid samples removed, the combination therewith of a rupturable valve disposed to normally interrupt communication between the fluid chamber and the formation to be sampled including an explosive charge associated therewith, explosive charges within each of the packer members for selective expansion thereof into sealed relation with the formation, a knife assembly disposed at at least one end of each of the packer members including an explosive charge associated with each knife assembly for actuation thereof to sever at least one end of each packer member, and a series of electric detonating means, each being of a selected resistance for detonating in succession the explosive charge for expansion of said packer members, the explosive charge for rupturing of said valve, and the charge for actuation of said knife assemblies to provide for release of the apparatus and contained fluid sample from the well bore.

7. In a well testing device according to claim 6 wherein said detonating means include a main conductor extending from the surface of the well bore through said device, branch conductors of varying resistivity interconnecting said mean conductor and each of said charges, and a power source to apply a successive increase in voltage across said main conductor for successive detonation of said charges.

8. In a well testing device according to claim 6 wherein each knife assembly is characterized by a circular knife disposed in outer concentric relation to said tubular means and a ring-like guide member for each knife so constructed and arranged as to cause a generally helical advance of the knife through the respective packer upon detonation of the charge.

9. In a well testing device for the removal of a fluid sample from a selected formation in a well bore having tubular means with an inlet therein for sample removal and means for closing the inlet to trap the sample within the testing device, and expansible packer members on said tubular means, the combination therewith of explosive charges associated with each of the packer members for expansion thereof, release means disposed at at least one end of each of the packer members including an explosive charge associated therewith for actuation thereof to release each packer member, and detonating means for each charge, said detonating means each being of a selected resistivity for detonating in succession the explosive charge for expansion of said packer members and the charge for actuation of said release means to provide for release of the apparatus and contained fluid sample from the well bore.

10. In a well testing device for the removal of a fluid sample from a selected formation in a well bore having telescoping members arranged for limited slidable movement between a first position in which inlet ports on the members are aligned for sample removal and a second position in which the inlet ports are closed to trap the sample within the testing device, spaced expansible packer members on the outer tubular member and a fluid chamber to receive the fluid sample removed, the combination therewith of a rupturable valve containing an explosive charge disposed to normally interrupt communication between the fluid chamber and the formation to be sampled, explosive charges associated with each of the packer members for expansion thereof, release means disposed at at least one end of each of the packer members including an explosive charge with each release means for actuation thereof to cause release of each packer member, and a detonating wire including branch wires of varying resistivity for detonating in succession the explosive charge for expansion of said packer members, the explosive charge for rupturing of said valve, and the charge for actuation of said release means to provide for release of the apparatus and contained fluid sample from the well bore.

11. In a wireline tester for the removal of fluid samples from a selected formation in a well bore having telescoping members arranged for limited slidable movement between a first position in which inlet means on the members are aligned for sample removal and a second position in which the inlet means are closed to trap the sample within the tester, spaced expansible packer members on the outer tubular member and a fluid chamber to receive fluid samples removed, the combination therewith of means communicating with the formation to equalize the pressure above and below said packers, a rupturable valve containing an explosive charge disposed to normally interrupt communication between the fluid chamber and the formation to be sampled, explosive charges within each of the packer members for expansion thereof, a knife assembly disposed at at least one end of each of the packer members including an explosive charge associated with each knife assembly for actuation thereof to sever at least one end of each packer member, and a detonating wire connected to the cable and extending through the tester with branch lines of varying resistivity for detonating in succession the explosive charge for expansion of said packer members, the charge for rupturing of said valve, and the charge for actuation of said knife assemblies to provide for release of the tester and contained fluid sample from the well bore.

12. In a wireline formation testing apparatus having tubular means with an inlet and a fluid chamber to be selectively opened to receive a fluid sample from the formation, the combination of a pair of rubberlike packer members disposed in spaced apart relation above and below the inlet and said packers being expansible into sealed relation with the formation; at least one knife assembly associated with each packer and being disposed at one end thereof, each knife assembly having an annular body portion being recessed adjacent to the end of the packer, a guide member positioned within the recess and a circular knife member in the recess between said body and said guide, one of said guide and knife members including spaced projections carried in helical slotted portions in the other of said members; and means associated with each of said knife assemblies each engageable with said knife to cause advance of said knife member in helical fashion to sever the end of each packer thereby to enable release of said packers for removal of said assembly from the well.

13. A packer assembly for a well tool and the like comprising tubular means with an inlet therein and at least two rubberlike packer members disposed in spaced apart relation above and below the inlet and said packers being expansible into sealed relation with the formation; at least one knife assembly associated with each packer and being disposed at one end thereof, each knife assembly having an annular body portion being recessed adjacent to the end of the packer, a guide member positioned within the recess and a circular knife member in the recess between said body and said guide, one of said guide and knife members including spaced projections carried in helical slotted portions in the other of said members; and actuating means associated with each of said knife assemblies being engageable with said knife to cause advance of said knife member in helical fashion to sever the end of each packer thereby to enable release of said packers for removal of said assembly from the well.

14. A packer assembly for a well tool and the like, comprising a tubular member, at least one rubberlike packer member disposed on said tubular member and containing an explosive charge therein for selective expansion of said packer, at least one knife assembly associated with said packer and being disposed at one end thereof, each knife assembly having an annular body portion carried on said tubular member being recessed adjacent to the end of the packer, a guide member positioned within the recess and a circular knife member in the recess between said body and said guide with an explosive charge position behind said knife member, one of said guide and knife members including spaced projections carried in helical slotted portions in the other of said members, and detonating means connected to said explosive charges being operative to detonate said charges in succession to expand said packer and to cause advance of said knife member in helical fashion to sever the end of said packer thereby to enable release of said packer for removal of said packer assembly from the well.

15. A packer assembly for a well tool and the like, comprising a generally tubular supporting member, at least one pair of rubberlike packer members disposed on said support member and containing an explosive charge therein for selective expansion of said packer, a knife assembly disposed at each end of said packer and with each having an annular body portion being recessed adjacent to the end of the packer, a guide member positioned within the recess and a circular knife member in the recess between said body and said guide with an explosive charge disposed behind said knife member, one of said guide and knife members including spaced projections carried in helical slotted portions in the other of said members; and a detonating wire including branch wires of varying resistivity for detonating in succession the charge within said packer for expansion thereof and the charge for each knife assembly to enable release of said packer for removal of said tool from the well.

References Cited in the file of this patent

UNITED STATES PATENTS

| | | |
|---|---|---|
| 2,207,001 | Dillon | July 9, 1940 |
| 2,633,200 | Humason | Mar. 31, 1953 |
| 2,681,706 | Pottorf | June 22, 1954 |
| 2,736,260 | Schlumberger | Feb. 28, 1956 |
| 2,741,313 | Bagnell | Apr. 10, 1956 |
| 2,751,016 | Watzlavick | June 19, 1956 |